May 22, 1956  L. J. DAMMAN  2,746,528
TIRE REMOVER WITH A ROTATABLE WHEEL SUPPORT
Filed Jan. 26, 1953  2 Sheets-Sheet 1
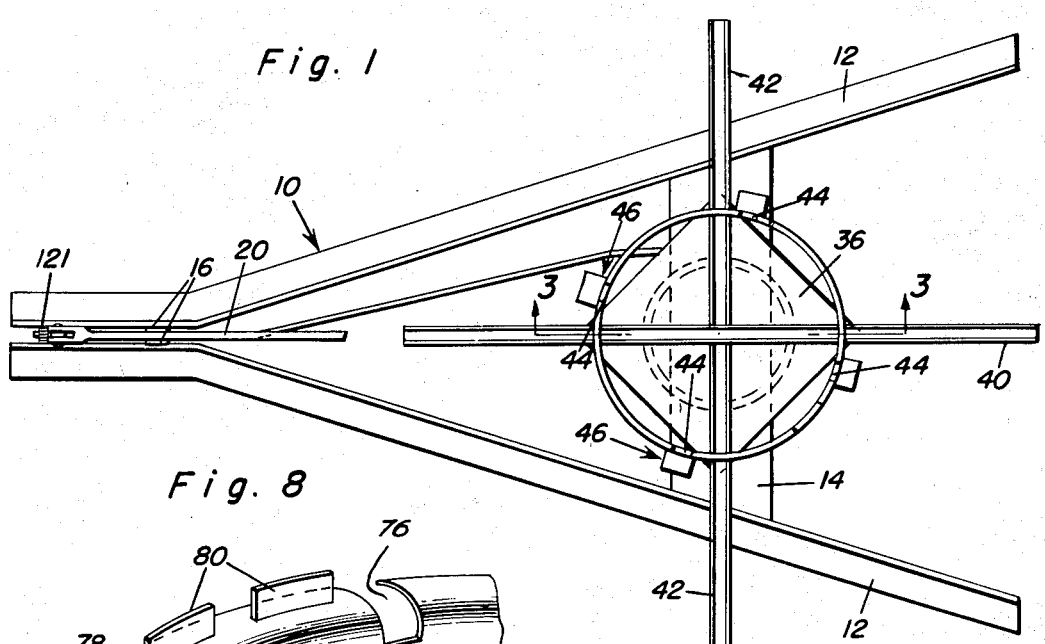
Fig. 1
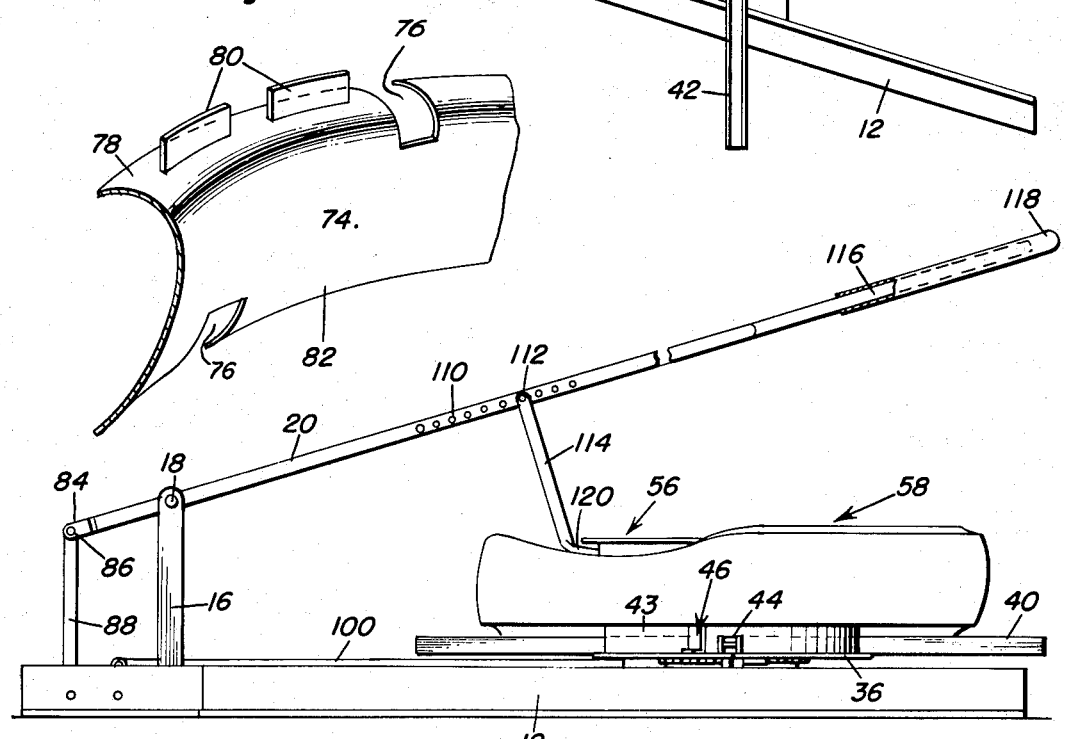
Fig. 8
Fig. 2
Lee J. Damman
INVENTOR.
BY *Clarence A. O'Brien*
and *Harvey B. Jackson*
Attorneys May 22, 1956
L. J. DAMMAN
2,746,528
TIRE REMOVER WITH A ROTATABLE WHEEL SUPPORT
Filed Jan. 26, 1953
2 Sheets-Sheet 2
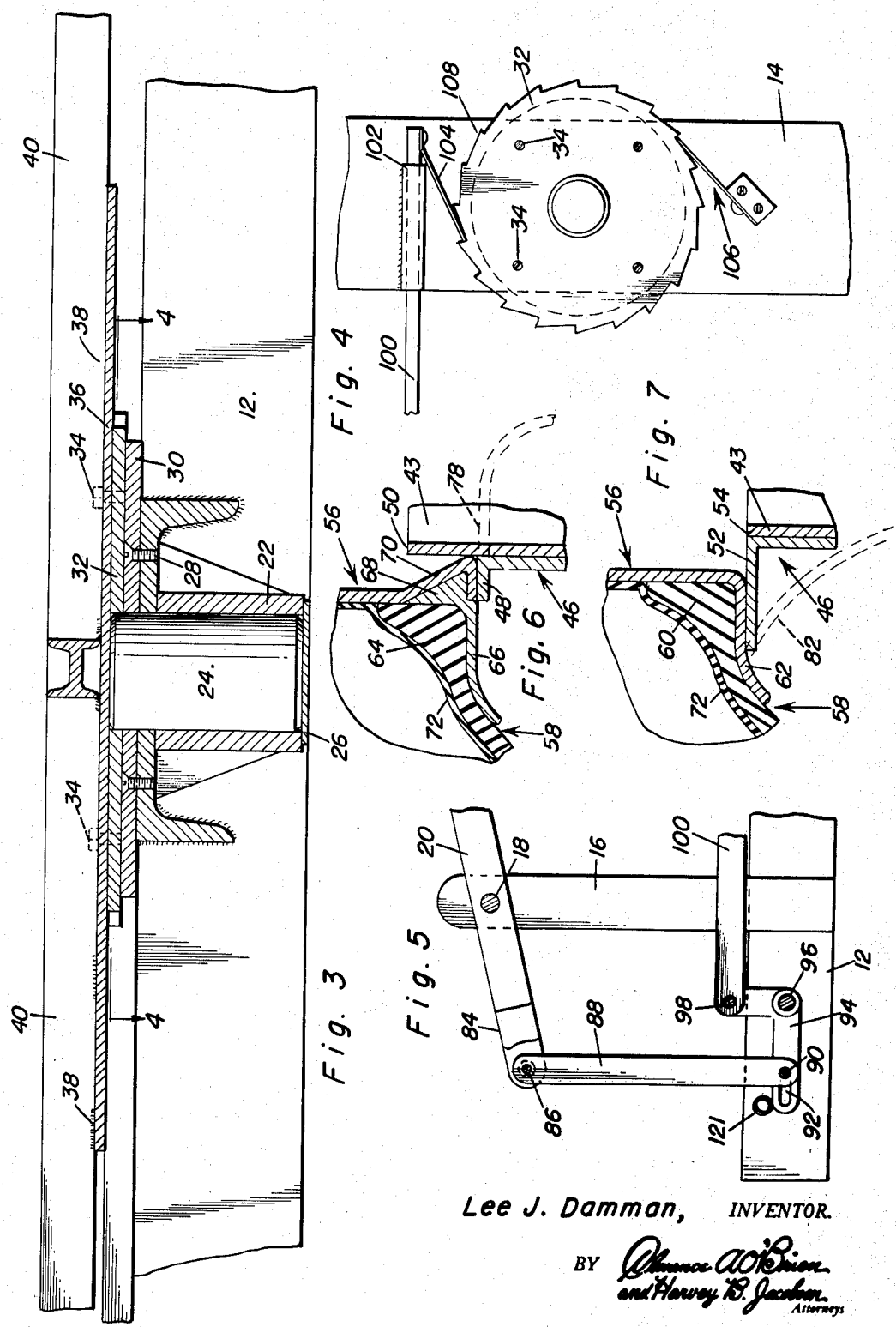
Lee J. Damman, INVENTOR.

United States Patent Office 2,746,528
Patented May 22, 1956

2,746,528
TIRE REMOVER WITH A ROTATABLE WHEEL SUPPORT

Lee J. Damman, Middleton, Wis.

Application January 26, 1953, Serial No. 333,113

7 Claims. (Cl. 157—1.26)

This invention relates to tire tools and more particularly to a semi-automatic tire tool wherein a tire may be broken down or removed from its rim.

An object of this invention is to provide a tool which will enable an operator to remove a tire from its rim with a minimum of difficulty and labor.

Another object is to provide a tire tool provided with an operating handle which utilizes a mechanical advantage in breaking down or removing a tire from its rim.

Another object is to provide a tire remover which rotates a wheel and tire assembly in step-by-step fashion in staggered relation to a series of removing operations.

Another object is to provide a tire tool adapted for use with all types and sizes of wheel and tire assemblies.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the tool;

Figure 2 is an enlarged side elevation of the tool having a tire and wheel assembly mounted thereon and with the breaking down tool operatively engaging the tire;

Figure 3 is a vertical section taken along line 3—3 of Figure 1 and showing details of the turntable on an enlarged scale;

Figure 4 is a horizontal section on a reduced scale taken along line 4—4 of Figure 3 showing details of the pawl and ratchet assembly;

Figure 5 is an enlarged vertical elevation of a portion of the device showing the connection between the operating handle and the pawl actuating rod;

Figure 6 is an enlarged vertical section of one side of a wheel and tire assembly showing the manner of engagement between the rim ring and the wheel and showing a modified form of rim ring in dotted lines;

Figure 7 is a view similar to Figure 6 but showing the manner of engagement between an opposite side of the wheel and tire assembly and a corresponding side of the rim ring and showing the modified rim ring in dotted lines; and Figure 8 is an enlarged perspective view of a section of the modified rim ring.

Referring now more particularly to Figures 1 and 2, reference numeral 10 indicates generally the base or A-frame which comprises a pair of divergent legs 12 and a cross bar 14. The legs may be of any conventional structural shape and are shown as angle members. The apex of the frame is provided with a pair of upstanding members 16 which pivotally support, by pin 18, a handle 20 received therebetween.

Cross bar 14 may be formed as an inverted channel, Figure 3 and depending centrally therefrom is a housing 22 within which is journaled a vertically disposed shaft 24. Cover 26 disposed at the lower end of housing 22 serves as a dust cap for the shaft. On the upper surface of the channel and secured thereto by means of countersunk machine screws 28 is a bearing plate 30. Overlying the bearing plate and suitably secured to shaft 24, as by welding or the like, is a ratchet wheel 32 bolted, at 34, to a cover plate 36 and welded, as at 38, to the cover plate is a cross-shaped assembly comprising a diametrical member 40 and radial members 42 disposed at right angles thereto. Thus, it will be seen that the ratchet wheel, cover plate and cross assembly form, with shaft 24, a turntable assembly rotatable in housing 22.

Referring now to Figures 1, 2 and 8, it will be seen that a rim ring is adapted to be supported by the cover plate 36 and cross assembly 40, 42 and that such rim ring includes a cylindrical main body portion 43 having spaced circular edges. The edges are provided, at 90° intervals along their circumference, with notches 44 which receive members 40, 42. U-shaped brackets 46 are secured at their bight portions to the outer surface of the cylindrical portion of the rim ring so that the bracket legs extend radially therefrom. As shown in Figures 6 and 7, one leg 48 of each bracket extends radially in spaced relation to a corresponding edge 50 of the cylindrical portion and the other leg 52 extends radially in coplanar relation to its corresponding edge 54.

This assemblage is provided particularly for use with a rim 56 and tire 58 of the type commonly found on trucks wherein one bead 60 of the tire is retained on the rim by means of an integral flange 62 while the other bead 64 is retained by means of a removable split ring 66. The removable ring is provided with an offset portion 68 which engages in a correspondingly offset portion 70 of the rim 56 and it will be seen that, when the ring is removed, the tire and inner tube 72 may be forced off the rim 56. For this purpose, flanges 48 are spaced inwardly of the outer diameter of rim 56. It may be well to note here that several different rim rings may be provided for the several different diameter tires currently in use and it is to be understood that while it is necessary to invert the rim ring when rim and tire assemblies of the type shown are encountered, such procedure is not necessary while performing operations on the conventional drop-center wheel used on passenger cars. In this latter type wheel construction, only the flange 52 need be used.

Figure 8 illustrates a modified rim ring which may be employed. In this instance, the main body portion 74 is unitary and generally arcuate in cross-section and notches 76, identical in purpose and construction to notches 44, are provided in opposite edges of the body portion. The upper edge defines a substantially horizontal flange 78 provided with upstanding members 80. As shown in dotted lines in Figure 6, flange 78 corresponds in function to flange 48 and the upstanding members serve to abut the apex of offset rim portion 70. The lower edge of body 74 extends outwardly at an obtuse angle to flange 78 presenting an inclined flange portion 82 similar in function to flange 52, as shown in Figure 7.

Referring now more particularly to Figures 2 and 5, it will be seen that the handle 20 extends beyond pivot 18 a short distance and terminates in a bifurcated end 84 pivotally connected by pin 86 to depending link 88. A pin 90 carried by the lower end of link 88 is engageable in lost motion slot 92 formed in one end of the bell crank pivotally connected, at 96, to the A-frame. The other end of the bell crank is pivotally secured, at 98, to one end of a pawl rod 100. With reference now to Figure 4, it is apparent that the other end of the pawl rod is slidably received in a guide 102 welded to cross bar 14 and carries a pawl 104 engageable with ratchet wheel 32. An idler pawl assembly 106 may be utilized to provide additional frictional engagement with wheel 32 to resist accidental turning of the turntable. By the foregoing assemblage, it will be seen that when the free end portion of the handle is raised, the pawl 104 will engage one of the teeth 108 of the ratchet wheel and rotate the turntable assembly. Upon opposite movement of the handle 20, the pawl will ratchet or slide back to a position wherein it may engage the next tooth 108.

From Figure 2, it is apparent that an intermediate portion of the handle 20 is provided with a plurality of apertures 110 within which a locking pin 112 is selectively engageable for the purpose of pivotally securing a depending tool 114 from the handle. Free end 116 of the handle is telescopically received by extension 118 provided so as to vary the leverage exerted by the handle. Tool 114 terminates in a foot or spade 120 which is engageable with the bead of a tire to force the same away from its retaining flange.

Accordingly, with the spade tool 114 properly positioned on the handle, downward movement thereof will force a portion of the tire bead away from its retaining flange and upward movement will rotate the turntable and the tire to a new position wherein the spade may perform its work.

For the purpose of returning the handle and tool to their upper position, a spring 121 is secured above one free end of crank 94, see Figures 1 and 5. The spring will normally urge and support the handle assembly in the upper position and downward movement of the handle will cause the spring to be deformed in a bowed manner.

It is pointed out that this tire tool will break down a tire from a conventional drop-center wheel but may be used to completely remove tire 58 from the particular type rim 56 shown, provided the rim ring is of sufficient width. In this case, the rim ring and tire are disposed as in Figure 7 wherein spade 120 will force bead 64 away from split retainer ring 66 and permit its removal. Then, the rim ring and tire are reversed, as in Figure 6, and the entire tube and tire assembly may then be forced off rim 56 with the spade.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a tire removing tool, an A-shaped base having an upstanding bracket adjacent its apex and a turntable rotatably mounted on the cross bar of said A-frame, said turntable including a horizontally disposed ratchet wheel, a handle pivotally secured adjacent one end thereof to the upper end of said bracket and overlying said turntable, a tire engaging tool depending from said handle toward the turntable, an operating rod extending longitudinally of said frame having one end slidably received on the cross bar adjacent said ratchet wheel, a pawl on said rod engageable with said ratchet wheel, and means operatively connecting the other end of said rod with said handle whereby vertical upward movement of the handle rotates the turntable.

2. The combination of claim 1 wherein said means comprises a bell crank pivotally connected to said frame and having opposite ends operatively connected to said handle and said rod.

3. The combination of claim 1 wherein said turntable includes a plurality of radially extending support members.

4. In a tire removing tool, a base, a turntable rotatably mounted on said base, an annular rim ring disposed on said turntable for receiving thereon a tire assembly, a force transmitting lever intermediately pivoted to said base and including a handle portion overlying said rim ring, a bead engaging element on said force transmitting lever for engaging the tire bead of a tire assembly, and force transmitting means for changing pivotal movement to rotary movement operatively connected to said turntable and to an end of said force transmitting lever for rotating said turntable in response to a return movement of said force transmitting lever.

5. In a tire removing tool, a base, a turntable rotatably mounted on said base for rotatably supporting a tire assembly, a force transmitting lever intermediately pivoted on said base and including a handle portion at one end overlying said turntable, said turntable including a ratchet wheel rotatable therewith on said base, force transmitting link means operatively connected to another end of said force transmitting lever and including a pawl engageable with said ratchet wheel, said pawl positively engaging the ratchet wheel upon movement of said lever away from said turntable and disengaging said ratchet wheel upon movement of said lever toward said turntable and a bead engaging element carried by said force transmitting lever for engaging the tire assembly adjacent the bead of the tire.

6. A tire removing tool as set forth in claim 5 wherein resilient means are provided on said base operatively engaged with said force transmitting link means for urging said force transmitting lever away from said base.

7. The combination as set forth in claim 5 including a rim ring for receiving a tire assembly horizontally on said turntable, said rim ring including an annular wall having a plurality of peripherally disposed brackets thereon, portions of said brackets extending radially of said wall for engaging said tire assembly.

References Cited in the file of this patent

UNITED STATES PATENTS

| Number | Name | Date |
|---|---|---|
| 445,588 | Pease | Feb. 3, 1891 |
| 1,481,061 | Hunter | Jan. 15, 1924 |
| 1,511,349 | Lober | Oct. 14, 1924 |
| 2,442,714 | Stack | June 1, 1948 |
| 2,449,960 | Toles | Sept. 21, 1948 |
| 2,478,214 | Turner | Aug. 9, 1949 |
| 2,523,979 | Weeks | Sept. 26, 1950 |
| 2,528,362 | Hauta | Oct. 31, 1950 |
| 2,563,293 | Tyler | Aug. 7, 1951 |
| 2,616,487 | Parks | Nov. 4, 1952 |